United States Patent

McCloskey

[11] 3,969,803
[45] July 20, 1976

[54] METHOD OF MANUFACTURING SPHERICAL BEARING

[75] Inventor: Albert R. McCloskey, Fairfield, Conn.

[73] Assignee: Heim Universal Corporation, Fairfield, Conn.

[22] Filed: Oct. 25, 1974

[21] Appl. No.: 517,878

[52] U.S. Cl. .................. 29/149.5 C; 29/149.5 B
[51] Int. Cl.² ................................... B21D 53/10
[58] Field of Search ............... 29/148.4 R, 149.5 R, 29/434, 149.5 B, 149.5 C

[56] References Cited
UNITED STATES PATENTS

| | | | |
|---|---|---|---|
| 2,804,679 | 9/1957 | Tracy | 29/149.5 B |
| 3,248,776 | 5/1966 | Brewster | 29/149.5 B |
| 3,268,983 | 8/1966 | Straub | 29/149.5 B |
| 3,303,557 | 2/1967 | Litsky | 29/149.5 B |
| 3,377,681 | 4/1968 | Kuhn | 29/149.5 B |
| 3,422,520 | 1/1969 | Bannister | 29/149.5 B X |
| 3,438,661 | 4/1969 | Bowen | 29/149.5 B X |
| 3,581,361 | 6/1971 | Loubier | 29/149.5 B |
| 3,736,635 | 6/1973 | Romer et al. | 29/149.5 B |
| 3,769,672 | 11/1973 | Eklund | 29/149.5 B |
| 3,825,983 | 7/1974 | McCloskey | 29/149.5 B |

*Primary Examiner*—C.W. Lanham
*Assistant Examiner*—V. K. Rising
*Attorney, Agent, or Firm*—James C. Wray

[57] ABSTRACT

A method of manufacturing a spherical bearing having an outer cylindrical member, an intermediate yieldable plastic member enclosed and supported thereby, said intermediate member having a concave inner surface and a spherical ball in bearing relationship with said intermediate member, said spherical ball having an outer surface complimentary to said concave inner surface of said intermediate member comprising the steps of preforming the outer member into a truncated conical member having a first radially inwardly annular lip formed at one end thereof, preforming the plastic intermediate member wherein substantially one-half of its inner and outer surface conforms generally to its final shape and the remaining portion of said intermediate member emanates outwardly therefrom, inserting said ball within the inner surface of said intermediate member such that a portion of the convex outer surface of said ball intimately engages the preformed concave inner surface of the intermediate member, inserting the intermediate member with the spherical ball contained therein within the outer member, applying a deforming force to the outer surface of the outer member by die means to form the outer member into a cylindrical shape and to deform the plastic intermediate member completely around said spherical ball and to fill the space between said spherical ball and said outer member, deforming the unformed end of said outer around the intermediate member to form a second radially inwardly annular lip and to complete the bearing.

3 Claims, 5 Drawing Figures

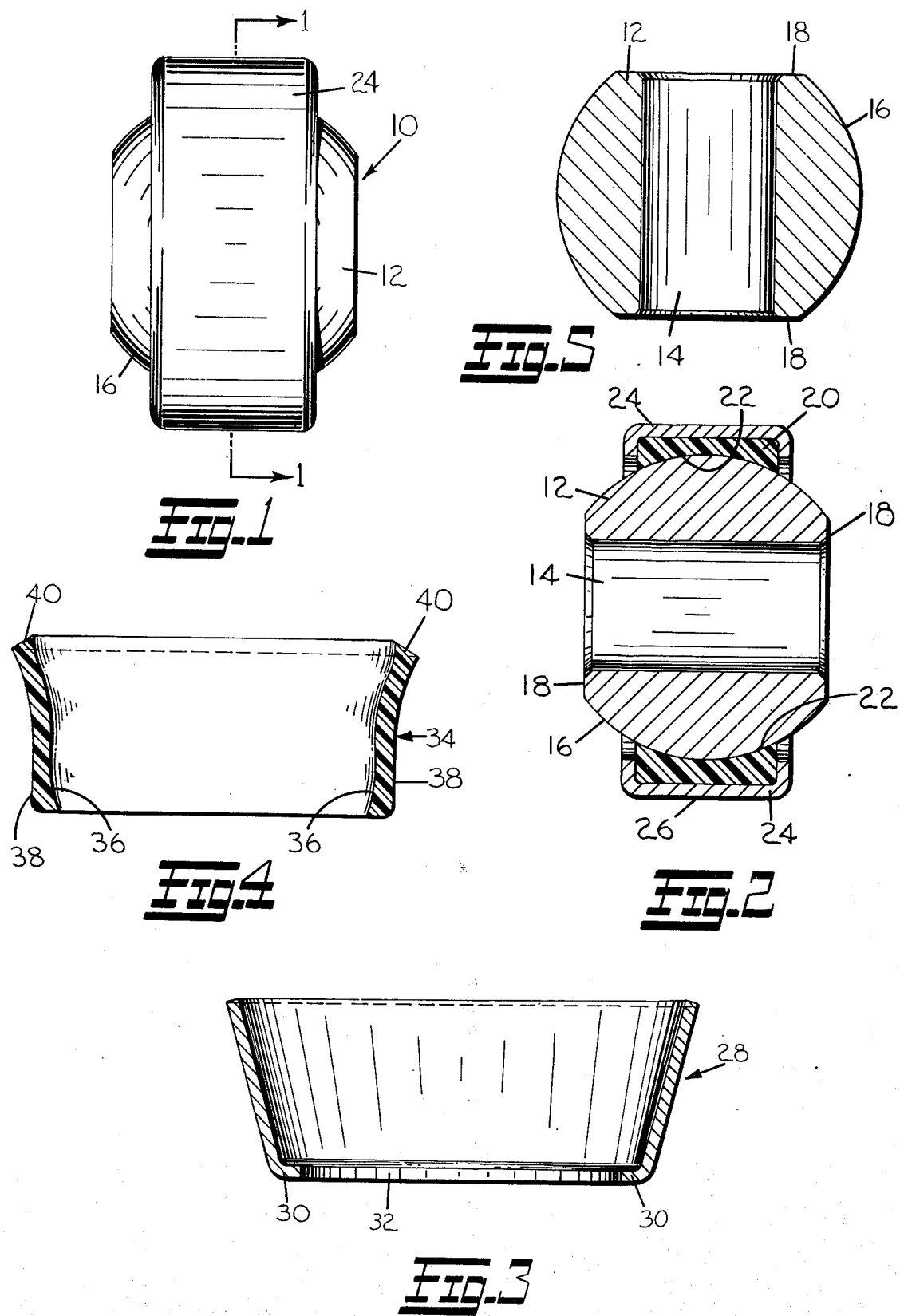

METHOD OF MANUFACTURING SPHERICAL BEARING

BACKGROUND OF THE INVENTION

This invention relates generally to spherical bearing and the method of making same. In particular, this invention relates to the method of manufacturing inexpensive spherical bearing typically having a sheet metal outer member, an intermediate plastic member and a spherical ball.

More particularly the present invention relates to a method of manufacturing a spherical bearing having an outer cylindrical member, an intermediate yieldable plastic member enclosed and supported thereby, said intermediate member having a concave inner surface and a spherical ball in bearing relationship with said intermediate member, said spherical ball having an outer surface complimentary to said concave inner surface of said intermediate member comprising the steps of preforming the outer member into a truncated conical member having a first radially inwardly annular lip formed at one end thereof, preforming the plastic intermediate member wherein substantially one-half of its inner and outer surface conforms generally to its final shape and the remaining portion of said intermediate member emanates outwardly therefrom, inserting said ball within the inner surface of said intermediate member such that a portion of the convex outer surface of said ball intimately engages the preformed concave inner surface of the intermediate member, inserting the intermediate member with the spherical ball contained therein within the outer member, applying a deforming force to the outer surface of the outer member by die means to form the outer member into a cylindrical shape and to deform the plastic intermediate member completely around said spherical ball and to fill the space between said spherical ball and said outer member, deforming the unformed end of said outer around the intermediate member to form a second radially inwardly annular lip and to complete the bearing.

The prior art is replete with various methods of manufacturing spherical bearings. It might be said that there is a constant search for an inexpensive method of manufacturing using relatively low cost material and resulting in a high performance bearing. As with most endeavors of this kind a compromise with some or all of these parameters is required. The compromise typically involves a substantial degradation of the performance characteristics of the bearing or substantial increase in the cost of material or machine and manual labor operations.

SUMMARY OF THE INVENTION

Accordingly, it is a primary object of the present invention to provide a method of manufacturing a spherical bearing having an outer cylindrical member, an intermediate yieldable plastic member enclosed and supported thereby, said intermediate member having a concave inner surface and a spherical ball in bearing relationship with said intermediate member, said spherical ball having an outer surface complimentary to said concave inner surface of said intermediate member comprising the steps of preforming the outer member into a truncated conical member having a first radially inwardly annular lip formed at one end thereof, preforming the plastic intermediate member wherein substantially one-half of its inner and outer surface conforms generally to its final shape and the remaining portion of said intermediate member emanates outwardly therefrom, inserting said ball within the inner surface of said intermediate member such that a portion of the convex outer surface of said ball intimately engages the preformed concave inner surface of the intermediate member, inserting the intermediate member with the spherical ball contained therein within the outer member, applying a deforming force to the outer surface of the outer member by die means to form the outer member into a cylindrical shape and to deform the plastic intermediate member completely around said spherical ball and to fill the space between said spherical ball and said outer member, deforming the unformed end of said outer around the intermediate member to form a second radially inwardly annular lip and to complete the bearing.

It is another object of the present invention to provide a method of manufacturing spherical bearing utilizing relatively inexpensive components and materials.

It is still another object of the present invention to provide a method of manufacturing spherical bearings requiring relatively few manufacturing steps and little or no manual labor input.

It is still another object of the present invention to provide a method of manufacturing spherical bearings capable of being adapted to automated high volume techniques.

It is still another important object of the present invention to provide an improved method of manufacturing spherical bearings resulting in a bearing having superior performance characteristics.

Other objects and advantages of this invention will become apparent as the present invention is better understood from the following disclosure and as shown in the accompanying drawings.

DESCRIPTION OF THE DRAWINGS

FIG. 1 is a front elevational view of a spherical bearing manufactured according to method of the present invention;

FIG. 2 is a sectional view of the bearing of FIG. 1 taken along line 1—1;

FIGS. 3, 4 and 5 show the unassembled components of the bearing of FIG. 1 wherein:

FIG. 3 is the outer truncated conical member;
FIG. 4 is the intermediate member; and
FIG. 5 is the spherical ball.

DESCRIPTION OF THE INVENTION

Referring now to the drawings, and in particular FIG. 1 and FIG. 2, there is shown an assembled spherical bearing manufactured in accordance with the method of the present invention wherein the assembly is generally designated by the numeral 10.

The spherical bearing comprises three parts:
a spherical ball 12 having a central bore 14;
a convex outer surface 16 and lateral faces 18;
an intermediate member 20 having a concave inner surface 22, the inner surface 22; and an outer member 24 having cylindrical outer surface 26. To a substantial extent the spherical bearing 10 is conventional in form in that typically the spherical bearing could be operationally connected to one part of an apparatus or device (not shown) at its central bore 14 and to another part of an apparatus or device (not shown) at its cylindrical outer surface 26 to provide omnidirectional motion therebetween.

The basic departure from the prior art is to be formed in the method of manufacturing the above depicted spherical bearing 10. Referring now to FIGS. 3 through 5 inclusive there is shown the various unassembled components of spherical bearing 10. The method of manufacturing as contemplated by the present invention includes the step of preforming the outer member 28 as by spinning, stamping or the like. The outer member 28 is preformed into a truncated conical shape and is provided with a first radially inwardly facing annular lip 30 at its smaller end defining a central bore or aperture 32.

The plastic intermediate member 34 is preformed as by molding, machining or the like wherein approximately one-half of its inner surface 36 and outer surface 38 conforms generally to its final shape as depicted in FIG. 2. The remaining portion 40 of the intermediate member 34 emanates outwardly from the conforming portion in a flared fashion.

The spherical ball 12 does not change its shape during the present method of manufacturing and is formed in a conventional manner as by machining or the like. It acts as a die member in a manner to be described below. The spherical ball 12 is inserted into the preformed intermediate member 34 such that a portion of its convex outer surface 16 intimately engages the preformed concave inner surface 36.

The intermediate member 34 with the spherical ball 12 contained therein is inserted within the inner surface of the truncated conical outer member 28 such that the conforming portion is located at the smaller end of said outer member 28.

A deforming force is then applied to the outer surface of the outer member 28 by die means (not shown). The die means may be a conical die or may be a shell or segmented dies driven radially inwardly to apply said deforming force. As the deforming force is applied to the outer surface of the outer member 28 the plastic yieldable intermediate member 34 will flow about the spherical ball 12 which will act as a die. The deforming force will be applied until the outer member assumes a cylindrical shape at such time the intermediate member will flow completely around the die-acting spherical ball 12 and will fill the space between the spherical ball 12 and the outer member.

At this juncture the unformed end of the outer member will be further deformed by an axial moving die or spinning or the like to form a second radially inwardly annular lip on the side of the outer member opposite the first annular lip 30 thereby completing the bearing assembly 10.

The component parts of the spherical bearing 10 could be manufactured from a wide range of materials, for example, the outer member 24 could be manufactured from sheet steel including stainless steel, the intermediate member could be manufactured from DELRIN (Trademark of DUPONT) and other suitable plastic materials which also may be glass reinforced; and the spherical ball 12 from suitable steels and alloys thereof.

Obviously, the present invention is not limited to the specific details as herein described, but is capable of other modifications and changes without depicting from the spirit and scope of the appended claims.

I claim:

1. A method of manufacturing a spherical bearing having an outer sheet metal cylindrical member, an intermediate yieldable plastic member enclosed and supported thereby, said intermediate member having a concave inner surface and a spherical ball in bearing relationship with said intermediate plastic member, said spherical ball having an outer surface complementary to said concave inner surface of said intermediate member comprising the steps of preforming the outer member into a truncated conical member having a first radially inwardly annular lip formed at one end thereof, preforming the plastic intermediate member wherein the outer surface of said intermediate member is substantially cylindrical with one end outwardly flared, the inner surface of said intermediate member being partially spherical in the region remote from said flared end of said intermediate member, inserting said ball within the inner surface of said intermediate member such that a portion of the convex outer surface of said ball intimately engages the preformed concave inner surface of the intermediate member, inserting the intermediate member with the spherical ball contained therein within the outer member, applying a deforming force to the outer surface of the outer member by die means to form the outer member into a cylindrical shape and to deform the plastic intermediate member completely around said spherical ball and to fill the space between said spherical ball and said outer member said intermediate member providing the entire bearing surface for said spherical ball, deforming the undeformed end of said outer member around the intermediate member to form a second radially inwardly annular lip and to complete the bearing.

2. A method of manufacturing a spherical bearing in accordance with claim 1 wherein the intermediate plastic member is manufactured from Delrin.

3. A method of manufacturing a spherical bearing in accordance with claim 1 wherein the die means is a conical die.

* * * * *